Jan. 30, 1968
H. A. KURTH ET AL
3,366,876
SYSTEM FOR ANALYSIS AND CONTROL OF DYNAMIC
CHARACTERISTICS OF MECHANISMS
Filed Jan. 4, 1963
3 Sheets-Sheet 1
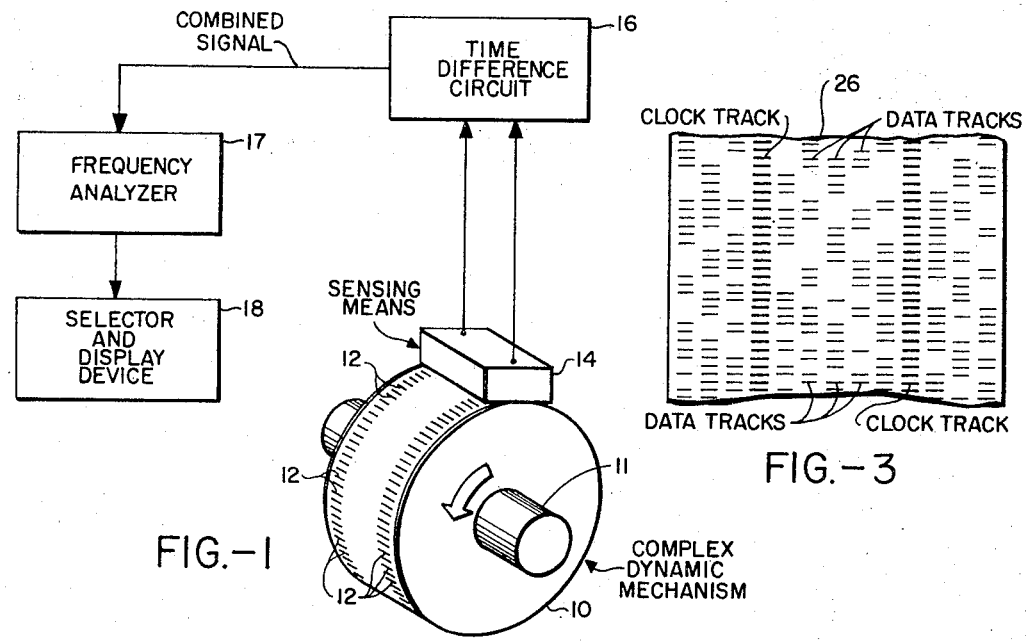
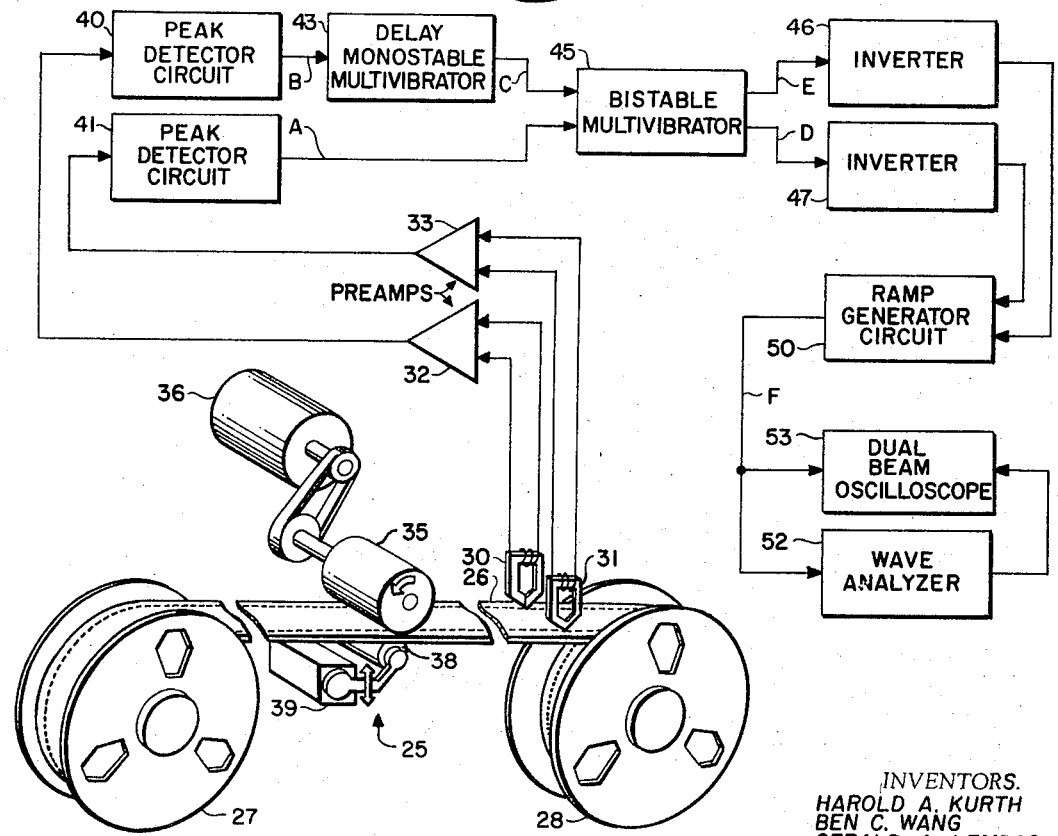
INVENTORS.
HAROLD A. KURTH
BEN C. WANG
GERALD A. LEMBAS
BY Robert S. Clay
ATTORNEY

United States Patent Office 3,366,876
Patented Jan. 30, 1968

3,366,876
SYSTEM FOR ANALYSIS AND CONTROL OF DYNAMIC CHARACTERISTICS OF MECHANISMS
Harold A. Kurth, Woodland Hills, Ben C. Wang, Los Angeles, and Gerald A. Lembas, Inglewood, Calif., assignors to Ampex Corporation, Redwood City, Calif., a corporation of California
Filed Jan. 4, 1963, Ser. No. 249,486
16 Claims. (Cl. 324—68)

This invention relates to systems and instruments for analyzing dynamic mechanisms, and more particularly relates to the analysis and control of the dynamic characteristics of tape transport mechanisms.

Modern systems and machines often entail the use of ultra-precise mechanical or electromechanical devices having continuous or cyclical driving or driven members. For example, rolling mills use high speed rolls which should rotate smoothly and around precisely parallel axes, and power plants use turbines which should rotate with minimum eccentricity. The tolerances permitted in these typical industrial applications are small but are far greater than those permitted in many types of scientific equipment in which precision is of utmost importance. The basic problems involved in attaining a high order of precision in systems of this nature can only be solved by arriving at an understanding of how each functional component part contributes to the total complex dynamic mechanism. Constant study and application to these problems has resulted in the generation of a great many separate techniques for system analysis and adjustment. By such techniques, for example, the scientist or skilled artisan seeks to determine whether a shaft is running "true" or whether members are misaligned relative to each other. The prior art techniques have primarily relied upon mechanical expedients and acute human sensitivities to particular phenomena such as are exhibited by the skilled mechanic who detects engine faults solely by listening to an engine.

Modern high speed precision equipment, however, demands far greater accuracy than that attainable by such rudimentary prior art techniques. The massive jet engine, for example, is operated at such high speed that slight eccentricities or aberrations introduce excessive moments and can ultimately lead to catastrophic failure. For this reason, elaborate testing and analyzing equipment has been used to detect the existence of faults and to provide a basis for adjustment of the mechanism. It is obviously impractical, however, to install comparable testing equipment on an operative aircraft to monitor the operation of each engine. Thus, when trouble develops in a complex mechanism of this kind, it is usually isolated and identified only after the difficulty has long since become significant. Piston engines are even more complex and subject to failure and even better illustrate the need for dynamic analyzing equipment which is usable with operational systems.

A related example can be found in a far different field, namely that dealing with magnetic tape transport equipment. Magnetic tape systems transport a magnetic tape between supply and takeup reels past magnetic transducers to effect the storage and playback of analog or digital data. There has been a continual emphasis on increasing both the speed of movement of the tape relative to the magnetic transducers and the density with which elemental patterns are recorded on the tape. Emphasis has also been placed on using thin, light, extremely pliant plastic backed magnetic tapes, because long lengths can be accumulated on relatively small reels and because the tapes can be started and stopped very rapidly, as is necessary for many digital operations.

High speed, high density magnetic tape recording techniques, however, inevitably impose stringent requirements upon the operating characteristics of the associated tape driving and guiding mechanisms. A severe problem arises because of a dynamic aberration which is conventionally termed dynamic skew and which is encountered because it is manifestly impossible to advance a pliant tape exactly along its longitudinal axis at high speed. The tape goes slightly off-angle, or skews, in its plane of movement so that directly opposite points on the tape edges do not move in true parallelism but lead and lag in a changing manner. Dynamic skew is particularly troublesome in digital recordings in which individual characters are represented by a series of binary digits, or bits, disposed transversely across the magnetic tape, with each bit lying in a different recording track. The number of tracks used may range for typical modern systems from relatively few to twenty or more, and two hundred to one thousand bits per lineal inch of tape may be used. The tape is usually driven bidirectionally and in intermittent fashion, being accelerated very rapidly to a high nominal operating speed, such as 150 inches per second. The resulting high data transfer rates are needed in order for the tape system to be compatible with modern high speed computing systems.

With these factors in mind, the serious difficulties which are encountered with dynamic skew become evident. If one end of each transverse line upon which lie the successive bits of a single data character is shifted a small amount (e.g. one mil) relative to the other end, at least some bits of that particular data character are indistinguishable from at least some bits of the preceding and succeeding characters. Dynamic skews of a small fraction of a mil are troublesome and limit operating performance, but cannot be discerned directly by even the most skilled and experienced operators. As even higher densities become employed, tape skews of the order of microinches become significant. The techniques now used to identify and measure such minute aberrations require electronic display and measuring circuitry to be used under special testing conditions, and even then only gross measurements are possible.

It should particularly be noted that while it is possible by prior art techniques to understand that dynamic skew is present and to meausre its total extent, there has heretofore been no practical way to isolate, measure or control the individual dynamic factors which contribute to dynamic skew. As a system gradually develops an increasing amount of dynamic skew, for example, error detecting circuits in the associated data processing system may shut the tape transport down. Upon determining dynamic skew as the probable cause of the difficulty, it has then been necessary to take the equipment out of service and to check the operation of each of its components laboriously and independently. Once the equipment is in the field and such difficulties develop, it must often be returned to the factory for further checking and maintenance. It would be far preferable, however, to be able to monitor the operation of the tape transport, keeping the transport in operation only as long as its dynamic skew characteristics meet selected tolerances. Once these tolerances are found to be exceeded in a system, the causes of the excessive error should be identifiable, without using complex and expensive laboratory techniques or testing equipment.

Comparable considerations apply, of course, to other continuously driven or cyclically operable machines in which dynamic variables are of great importance. Knowledge of the incipient failure of a particular mechanism in a complex power train, based upon some accurate and objectively measured criterion, is not only of incalculable value to such systems when in operation, but also provides a new basis for the manner in which they may be understood, tested and designed. It is highly desirable to be able to monitor the operation of a dynamic system, so as to foresee the possibility of catastrophic failure. When malfunctions occur it is similarly desirable to be able to check, simply and rapidly, the major likely causes of error. Further, it is most desirable to provide an objective basis for the measurement of the contributions of individual component parts to the operating characteristics of a dynamic mechanism.

It is therefore an object of this invention to provide novel dynamic motion analyzers.

A further object of this invention is to provide improved equipment for isolating variables in a dynamic system.

Yet another object of this invention is to provide improved methods for analysis of complex mechanical systems.

A further object of this invention is to provide a simple and inexpensive system for isolating and measuring the effect of specific variables in an operating mechanism.

Another object is to provide a means of constantly measuring dynamic skew in a magnetic tape system, and separately measuring and indicating the several factors contributing to the dynamic skew.

A further object is to provide a dynamic skew malfunction indication system for magnetic tape recording and reproducing systems.

Still another object is to provide instrumentation equipment for isolating the causes of mechanical malfunctions in elements of a magnetic tape transport.

These and other objects of the present invention are met by apparatus and methods which generate at least a pair of nominally like signal trains at least one of which is representative of the motion of a part of a complex mechanical system. The time differences between like segments of the signal trains are converted to a time-varying combined signal and specific frequency components of the combined signal are extracted to identify variables introduced by individual component parts of the complex mechanism.

In general terms, systems in accordance with the invention may generate a pair of pulse trains from separate incremental indicia sets disposed along parallel lines on the operating mechanism under investigation. The pulse trains have pulse repetition rates selected to be substantially higher than the characteristic frequency of the principal operating parts of the mechanical system. Mechanical aberrations in the operation of the system cause like pulse pairs from the two pulse trains to vary by an inconstant amount, $\Delta t$. The successive $\Delta t$ variations are employed to generate a complex multifrequency wave having corresponding time varying information. This complex multifrequency wave is applied to bandpass filters which individually pass characteristic frequencies of different individual component parts of the system.

As applied to a system for analysis of the dynamic skew of a magnetic tape, analyzers in accordance with the invention permit total dynamic skew, and all individual and material contributors to dynamic skew, to be measured concurrently. To this end, separate clock tracks on the tape may be employed for generation of the two pulse trains. Like pulse pairs, using one pulse generated from each clock track, trigger and reset a ramp generator circuit, providing a succession of amplitude varying pulses from the successive $\Delta t$ variations. The envelope of these amplitude varying pulses is the complex multifrequency wave, and contains components at the fundamental and harmonic frequencies of all elements which make material contributions to dynamic skew. Bandpass filters set at the frequencies of capstans, pinch rollers, and low inertia compliance mechanisms pass output signals which continually indicate the precise contribution of each of these parts of the system to total dynamic skew. Alternatively, a single clock track may be used for providing one pulse train and a reference signal at the same nominal frequency may be used for the other to provide a composite of dynamic skew and velocity variations such as timing and flutter.

Through employment of analyzers in accordance with the invention it is now known that these three last-mentioned factors are the first order contributors to dynamic skew. Second order contributors, such as driving mechanisms and tape guide mechanisms, and variation of vacuum chamber pressure may be isolated and measured in the like fashion.

Economic and reliable analyzer devices and systems in accordance with the invention may be used in a wide variety of forms. Thus they may be installed directly on operational tape transports, engines, or driven elements to provide continual monitoring of extremely minute and fast changing variables, and the individual contributors to those variables. Such analyzers may also be used as field testing instruments to provide direct indications of parts requiring corrective action. Further systems may be used in servo mechanisms for direct control of the variable being monitored.

A better understanding of the invention may be had by reference to the following description, taken in conjunction with the accompanying drawing, in which:

FIG. 1 is a block diagram representation of the general arrangement of analyzer systems in accordance with the invention;

FIG. 2 is a combined block diagram and partial perspective view of an analyzer system in accordance with the invention as applied to a magnetic tape transport system;

FIG. 3 is a fragmentary idealized view of the arrangement of data and clock tracks on a tape for use in the system of FIG. 2;

Figure 4:
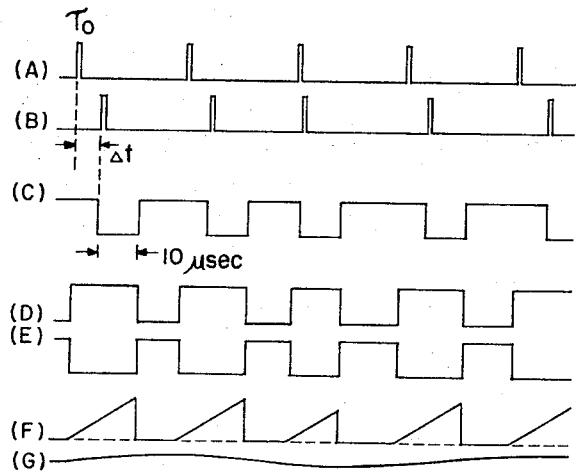
FIG. 4 is a time diagram, showing typical waveforms generated in the operation of the system of FIG. 2.

The system of FIG. 1 provides a general example of an analyzer in accordance with the invention, as used in conjunction with a complex dynamic mechanism. Although the mechanism is shown for simplicity as a rotatable drum, it should expressly be understood that many mechanisms provide the dynamic conditions needed for analysis. These conditions are that minute mechanical displacements may arise between separate and parallel reference axes or tracks which are fixedly defined relative to the mechanism. With the drum example the tracks are circumferential and displaced from each other relative to the axis of rotation. The minute mechanical displacements are in the circumferential direction and vary in accordance with the eccentricity of the drive shaft 11, the bearing mechanism (not shown), the drive mechanism (not shown) and any associated elements.

It will be understood that the drum example is given merely as an illustration and that like relationships are encountered with many other mechanisms. A highly stressed drive shaft, for example, generates varying longitudinal displacements between two parallel circumferential tracks when in operation. These displacements will vary with time in accordance with the operation of the drive mechanism, the bearing system, and the load on the shaft, among other things. Once this is appreciated it will be seen that similar relationships may be found in a jet engine, the rollers of a steel rolling mill, and in more common-place complex dynamic mechanisms such as washing machines. The longitudinal relative displacements may be minute, and vary at high speed, but are still readily measured through systems in accordance with the invention.

Along these parallel axes or tracks are disposed identifiable incremental indicia 12 which may be sensed by appropriate means. A significant factor here is that the frequency of change of the indicia during movement, which is dependent upon the speed of the mechanism 10 as well as the incremental displacement, should be greater, and preferably substantially greater, than the highest characteristic frequency which is to be the subject of analysis. The successive increments may be defined by recorded magnetic patterns, by elements having differing magnetic permeability, or by variable conductivity, reflectivity or transmissivity patterns, or even by physical variations. Thus the increments 12 may appropriately be sensed by magnetic, electric, photosensitive or mechanical means. For convenience the increments of the two tracks are assumed to have nominal parallelism, although they may have a fixed longitudinal displacement relative to the tracks which displacement may be partially or fully compensated for by relative displacement of the associated sensing means 14.

The sensing means 14 therefore generate time varying electrical signal indications from each of the tracks during the operation of the dynamic mechanism 10. For the theoretically ideal example, like signal increments of the two time varying signals will maintain a given and fixed time relationship. For all practical examples, however, the longitudinal mechanical variations between the two tracks will introduce time variations between the paired signal increments.

The two signals from the sensing means 14 may then be combined into a single signal in which these time variations are represented as some form of modulation. Successive signal increment pairs may be used, for example, to generate a pulse train having pulse duration modulation, or a pulse train having amplitude modulation. The repetition frequency of the signal increments constitutes a carrier frequency upon which the time variations between the paired signal increments are superimposed as modulation. No matter what the type of modulation, the information contained therein is the same. Accordingly, the combined signal is derived in this general example from a circuit which is broadly referred to as a time difference circuit 16.

Under the stated conditions the combined signal is found to be a complex multifrequency wave which contains frequency components at the characteristic frequencies of all the principal and at least most of the secondary contributors to system imbalance. The characteristic frequencies of component parts of a drive system having fixed speed ratios are known directly, for example, once the rotational speed of one member of the system is known. Other component parts may require more extended calculations before their characteristic frequencies are identified. In some instances, frequency components of a wholly unexpected nature may be present and identified solely by such presence. Nevertheless, all frequency components in a range of interest may be derived by a frequency analyzer 17 and displayed individually or concurrently by a selector and display device 18. The frequency analyzer 17 may consist of selected fixed bandpass filters as one example, or a spectrum analyzer as another. The selector and display device may include a switching and indicating meter arrangement or a conventional oscilloscope.

It is important to bear in mind that this system permits individual analysis and measurement of the mechanical variations of individual components of a complex system. The measurements are often far more accurate and reliable than the best measurements made under static conditions. Further, they permit, for the first time, the relative significance of all major factors to be objectively compared. By this means also wholly unexpected factors may be brought to light.

It has been pointed out that only one periodic signal need be generated from an indicia set on the mechanism under analysis, and that the other may be provided by a reference signal having a like nominal frequency. For different applications this second periodic signal may be derived from a stable frequency source or a flywheel circuit triggered by the clock pulses. Either will provide the complex multifrequency wave containing monofrequency components representative of imbalances due to individual components. It is generally preferred, however, to use two indicia sets because lesser variations may be sensed and because there is greater freedom from velocity variations in the mechanism.

A specific example of a dynamic analyzer in accordance with the invention is provided by the tape transport system shown in FIG. 2. The magnetic tape transport system 25 which is there generally illustrated is assumed to be a digital system in which a number of parallel tracks of densely packed binary digital patterns are recorded and from which the data is reproduced. The magnetic head assemblies, the various compliance means, tape guiding means, and the associated electronics by which high speed, high data rate operation with intermittent bidirectional starts and stops is achieved may be conventional and accordingly have not been illustrated in detail. For the purposes of the present description it suffices to state that the tape 26 moves between a supply reel 27 and a take up reel 28, under the control of associated programming means (not shown) and that the multi-head assembly or assemblies in cooperation with the tape 26 effect proper recording and reproduction of data. The data must be densely packed on the tape, such as at densities of 200 or 556 bits per inch, and the tape must be moved at high speed such as rates of the order 150 inches per second, in order for the desired high data transfer rate to take place. Because the tape 26 is pliant and thin, because the tape is moved intermittently, and because the data is so densely packed, any substantial longitudinal variation between opposite edges during tape advance can result in the loss of data or the occurrence of other types of errors.

In order for high density digital recording systems to operate properly, they usually use one or more clock tracks on the tape 26. A clock track is usually associated with each binary coded decimal character, so that there is one clock track for each six or seven parallel tracks of the typical system. Each clock track has a like magnetization pattern at each recording incremented along the length of the tape. When the tape is perfectly aligned, the clock tracks are usually also in transverse alignment, so that like increments may be paired together. This is not necessary, however, as is shown below. In the arrangement of FIG. 2, the tape 26 for which is shown in more detail in FIG. 3, two transversely spaced clock tracks are assumed to be employed, and different magnetic reproducing heads 30, 31 are disposed in association with each track. Each of the reproducing heads 30, 31 is coupled through a separate preamplifier circuit 32, 33 to the associated circuits.

In the usual digital tape transport, as shown in FIG. 2, intermittent tape motion is provided by a continuously rotating capstan 35 which is driven by a constant speed or servo controlled motor 36. Oppositely rotating capstans for the different directions of movement are usually employed, although only one capstan 35 is here shown. The tape 26 is driven by the capstan 35 when urged into contact with the capstan by an oppositely disposed pinch roller 38 which is mounted on the end of a lever arm coupled to a high speed actuator device 39. Although all of the parts which drive or engage the tape are made to precise dimensions, and aligned by precision techniques, they do not eliminate the problem of skew and cannot forestall the introduction of variations due to wear and part failure. Further, the total contributions to dynamic skew constitute the sum of the errors of each of the component parts, which at any instant may be cumulative and with an unadjusted system may be far in excess of the permissible limits.

Dynamic analyzers in accordance with the invention, however, permit the total dynamic skew to be monitored constantly during operation, and even more permit the individual contributors to dynamic skew to be separated, identified and measured. This analysis is based essentially on the nominally alike pair of pulse trains having a high repetition rate and generated by the reproducing heads 30 and 31 from the tape 26. After preamplification, each of these pulse trains is applied to a different conventional peak detector circuit 40, 41 respectively, so as to provide narrow pulses which precisely identify in time the substantial midpoints of the somewhat rounded reproduced individual pulses. The pulses derived from like positions along the two separate clock tracks (waveforms A and B of FIG. 4) are, because of dynamic skew, not reproduced in exact time coincidence but one may lead or lag the other by some minute time differential $\Delta t$. This relationship, $\Delta t$, is shown relative to waveforms A and B in FIG. 4. In order to maintain a constant lead-lag relationship between the reproduced pulses of each successive pair, the pulses from one peak detector circuit 40 are applied to a one shot delay multivibrator 43, which generates a negative-going rectangular pulse whose leading edge coincides with the leading edge of the pulse from the peak detector circuit 40 and whose trailing edge follows at a constant time interval thereafter, as for example, ten microseconds. Thus, the trailing edge of the pulse from the one shot delay multivibrator 43 follows $\Delta t + 10$ $\mu$sec. after the leading edge of the pulse from the second peak detector circuit 41. The positive-going pulse edges in these two channels are used to set and then reset a bistable multivibrator circuit 45 so that each pulse pair reproduced from the two clock tracks on the tape results in the generation of a pulse of $\Delta t + 10$ $\mu$sec. at the bistable multivibrator 45. As $\Delta t$ changes with dynamic skew, the durations of individual pulses in the pulse train from the bistable multivibrator 45 correspondingly change. In the present example, signals on both output terminals of the bistable multivibrator circuit 45 are utilized, providing rectangular pulses of opposite going polarity as shown at waveforms D and E in FIG. 4, through separate inverter circuits 46, 47 to separate input terminals of a ramp generator circuit 50. The ramp generator circuit 50 constitutes a triggered type of sawtooth waveform generator, the ramp signal being initiated by the beginning of the applied control pulses and terminating at their ending. A particular arrangement is described in greater detail in conjunction with FIG. 5.

The output signal from the ramp generator circuit 50 therefore consists of a series of sawtooth pulses of varying duration (waveform F in FIG. 4). Because the slope of the ramp of each sawtooth pulse is the same, the peak amplitude attained varies for successive pulses with a constantly changing dynamic skew, and it is clear that these amplitude variations correspond to the $\Delta t$ variations at the magnetic tape. The successive sawtooth pulses constitute the high frequency carrier for amplitude modulation which represents $\Delta t$. This amplitude modulation may in turn be extracted by appropriate filtering circuits, such as those provided in a conventional wave analyzer 52. The envelope (waveform G) of the signal from the ramp generator circuit 50 itself constitutes a complex multifrequency wave containing the fundamentals and harmonics of the charactertistic frequencies of the various component parts of the dynamic system which drives the magnetic tape. If tape stretch or other variations in the tape itself are present, these will also introduce signal components. For continuous monitoring of the dynamic skew of the tape, this output signal need only be applied to a conventional cathode ray oscilloscope 53. Assuming that a dual beam oscilloscope 53 is used for convenience, selected individual frequency components derived from the wave analyzer 52 may be used to modulate the second beam, in accordance with particular phenomena under investigation.

Practical use of this system in accordance with the invention has enabled attainment of an understanding of magnetic tape systems which was neverbefore feasible. The characteristic frequency of a capstan is known, because it is simply the rotational rate of the capstan, such as 25 revolutions per second. With the wave analyzer 52 set to extract the 25 cycle per second component, there is immediately made available a quantitative measurement of the amount of dynamic skew which is contributed from the capstan itself.

Such measurements further confirm the fact that the capstan is one of the three first order contributors to dynamic skew in a typical digital tape transport. A second first order contributor to dynamic skew is the setting of the pinch roller, which must be in precise alignment relative to the capstan and which must urge the tape against the capstan with precisely the proper amount of pressure. The characteristic frequency of the pinch roller is different, such as 70 c.p.s., and accordingly is readily separated, identified and measured. The third first order contributor is usually the compliance mechanism which is employed and the contribution of which varies in accordance with the operating state of the system. A large dynamic skew error may be introduced under start up, stopping or reversal conditions whereas a very low contribution may be present under steady state conditions. These characteristic frequencies may vary somewhat, but by operating the wave analyzer 52 to scan the applicable frequency range, it is readily practicable to identify the various characteristic frequencies and thereafter to measure them under transient conditions.

In like manner, all of the principal characteristic frequencies of the parts of the system which act to drive the tape and which therefore have some effect upon dynamic skew may be analyzed individually. It has actually been found that unexpected contributions may exist at certain frequencies. Once knowing that such is the case, it is possible to deduce the specific component part or relationship which causes the aberration.

Analytical methods in accordance with the invention therefore provide a substantial advance in the understanding of complex dynamic mechanisms, because they permit concurrent and objective identification and measurement of total effects, as well as individual contributions to the total effects. The principal active element is a transistor 55 which is coupled to receive applied input signals at an input terminal 60 coupled to its collector circuit and an input terminal 61 coupled to its base circuit. The base 56 is coupled between a pair of resistors 64, 65 which form a voltage divider from a DC source 63. At the start of the square wave applied at input terminal 61 the voltage on the base goes from approximately $-0.3$ volt to $+3.5$ volts, turning the transistor 55 off. The $-6$ volt level applied to input terminal 60 starts to charge an integrating capacitor 66 through a resistor 68 in a linear fashion. The charge on the capacitor 66 and the voltage at an output terminal 70 continue to build up linearly until the square wave at the input terminal 61 returns to zero. At this time, the voltage at the base 56 drops abruptly to $-0.3$ volt, returning the transistor 55 to conduction at the same time as the voltage at the input terminal returns to zero. The transistor 55 thereby provides a low impedance path for the discharge of the capacitor 66. The circuit accordingly charges to a maximum potential which is linearly proportional to the duration of applied pulses.

Figure 5:
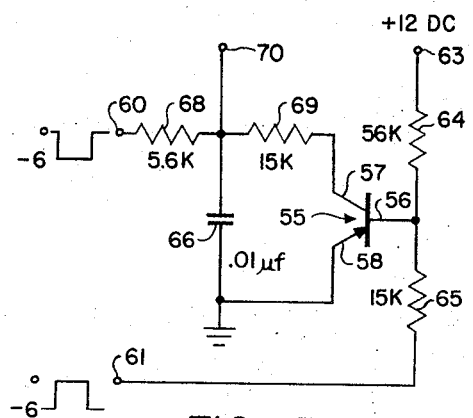
FIG. 5 is a schematic circuit diagram of one form of ramp generator circuit which may be used in the system of FIG. 2.

The ramp generator circuit of FIG. 5 is particularly simple and economical and cooperates effectively with the associated elements in the system of FIG. 2.

Figure 6:
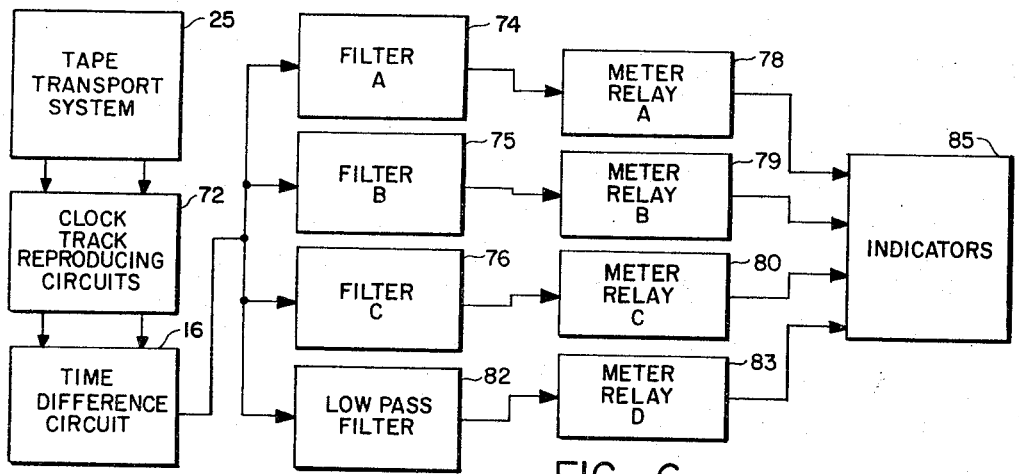
FIG. 6 is a combined partial perspective and block diagram representation of a form of analyzer system in accordance with the invention which provides continuous warning and indication operation.

The example which is shown in FIG. 6 is a warning indicator type of system. A magnetic tape transport system having a pair of clock tracks is again assumed, for convenience, although other arrangements may be used. For example, there are shown below a number of other systems in which the dynamic system and the incremental indicia are provided by other means. In the system of FIG. 6, the sensed pulse pairs are applied, after the introduction of a selected relative delay between them, to control a time difference circuit 16 in the fashion of the system of FIG. 2.

The output signals from the time difference circuit 16, however, are coupled directly to a number of separate filter 74–76 and meter relay 78–80 combinations. A meter relay is a conventional indicating meter type of device which is arranged to close a circuit to provide a warning signal whenever the signal being monitored exceeds a selected level. The filters 74–76 are bandpass filters, and each is set to pass a narrow frequency band at the characteristic frequency of a different major contributor to dynamic skew, the effect of which it is desired to monitor. Additionally, a low pass filter 82 and meter relay 83 combination is utilized to monitor the total dynamic skew variation. With many systems this will be unnecessary inasmuch as it can safely be assumed that dynamic skew is within acceptable limits if the individual major contributors do not exceed their predetermined maximum amplitudes.

Whenever one of the meter relays 78–80 or 83 is triggered, the system may immediately be shut down or a warning light on associated indicators 85 may be actuated so as to denote that a specific maintenance check is needed. Thus, the system operator is able to determine instantly and objectively not only whether the dynamic characteristics of its system are within acceptable limits, but specifically where the defects are occurring. Defective capstan bearings, pinch roller bearings, and improper pinch roller settings are readily identified from each other. The pinch roller setting may be adjusted to the correct nominal value by direct observation of the effect of changes in adjustments on the meter amplitude indication.

A tape transport system having a pair of clock tracks is particularly convenient for use with systems in accordance with the invention. Many other magnetic tape transports which do not utilize a pair of spaced clock tracks or their equivalent may of course be modified to provide such tracks along the opposite of the tape edges. With other forms of dynamic systems, however, the integral inclusion of high density incremental indicia becomes uneconomic or impractical. For such installations, particularly for lower speed systems, separate indicia bearing members may be attached to the mechanism under analysis. It is not necessary that the two indicia bearing members be widely separated in the transverse direction. Each should, however, be mounted to have essentially the same movement as the member on which it is mounted.

Figure 7:
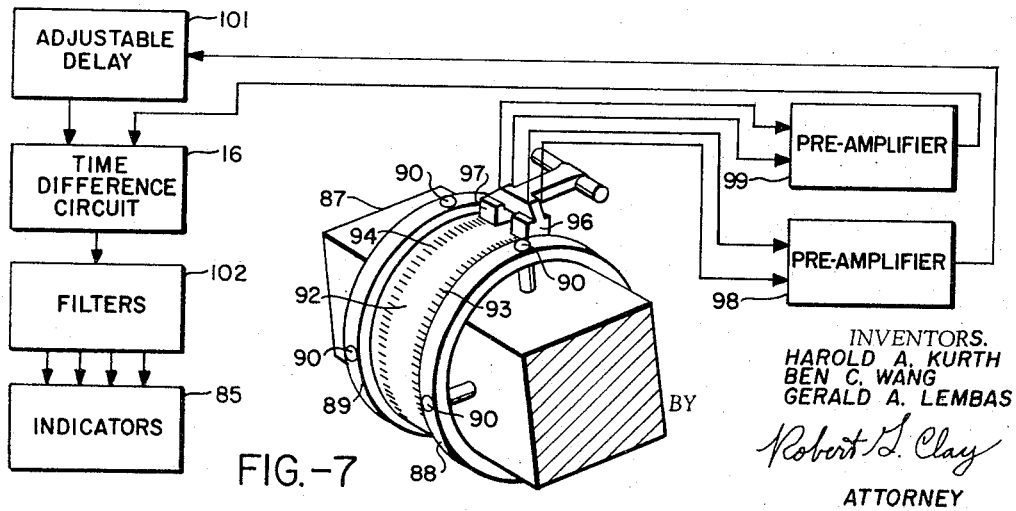
FIG. 7 is a combined perspective and block diagram view of another form of analyzer in accordance with the invention.

The FIG. 7 system illustrates how an arregularly shaped member, such as a rotating square shaft 87 may receive an analyzer system according to the invention. A pair of circumferential rings 88, 89 may be mounted at spaced apart points along the axis of rotation of the shaft 87. Each ring may be set concentric with the axis of shaft rotation by adjustable screws 90. Some eccentricity can be tolerated if the rings 88, 89 are coaxial with each other. The rings 88, 89 are preferably separate, in order that each may follow the variations of the associated part of the shaft 87 without undue restraint. Thus each may have a circumferential track bearing incremental indicia. It is also convenient to couple the rings 88, 89 as shown by a pliant magnetic tape 92 bearing two clock tracks 93, 94, with the opposite edges of the tape 92 being retained within the rings 88, 89. Thus the clock tracks 93, 94 are free to undergo longitudinal variations relative to each other during shaft 87 movement.

The clock tracks 93, 94 may be sensed by a pair of air bearing heads 96, 97, and the signals therefrom coupled through preamplifiers 98, 99 to the processing circuits. In setting up the rings 88, 89 the clock tracks 93, 94 may have some fixed relative displacement, which may be compensated for by an adjustable delay circuit 101 in one of the channels. The signals may then be coupled through the time difference circuit 16, and selected frequency components extracted at filters 102 for actuating indicators 85.

It is therefore not necessary, as shown by the system of FIG. 7, for a complex dynamic mechanism to have a particular configuration, or be specifically modified itself. It must further be appreciated that the system makes possible the analysis of variations which are both extremely small and very high speed, and which therefore are outside the capabilities of prior art systems.

Figure 8:
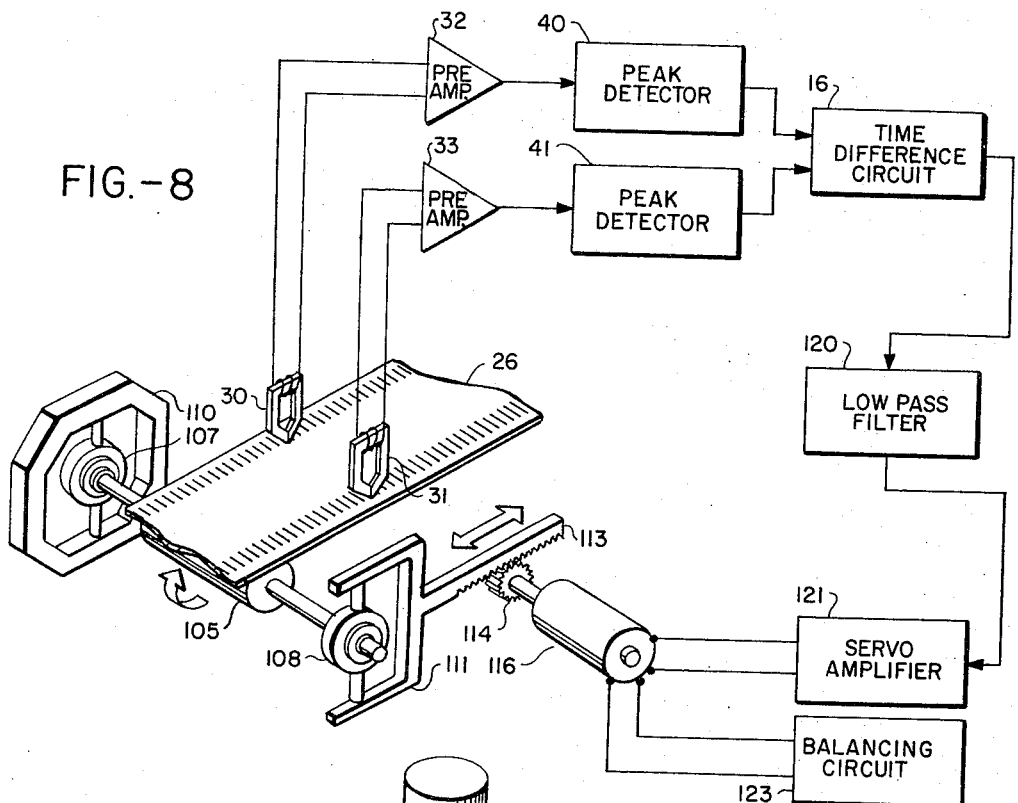
FIG. 8 is a combined perspective and block diagram view of a servo system in accordance with the invention; and, FIG. 9 is a combined perspective and block diagram view of yet another illustrative system, useful with moving sheet strip material.

A continuous control system in accordance with the invention is provided by arrangements such as that shown in the example of FIG. 8. The system illustrates the control of dynamic skew in a magnetic tape transport, only the tape 26 and clock track reproducing heads 30, 31, of which are shown in detail. To effect control of dynamic skew, the tape 26 is passed over a freely rotating guide roller 105 which is journalled in a pair of pivotable ball bearing mechanisms 107, 108. One of the ball bearing mechanisms 107 is pivotally mounted in a fixed frame 110 on one side of the tape 26 while the other is pivotally mounted in a movable yoke member 111. The yoke member 111 supporting this longitudinally movable bearing 108 is extended from a rack 113 and pinion 114 mechanism which is driven by a servo motor 116, so that the bearing can be moved along the direction of the tape. The guide roller 105 member is thus rotated about the fixed bearing 107 in either direction relative to the longitudinal movement of the tape 26 to introduce a compensating skew to the dynamic skew which is detected by the system.

In the detection of the actual dynamic skew error, the reproducing heads 30, 31 which are associated with the different clock tracks on the tape 26 are coupled through preamplifiers 32, 33 to separate peak detector circuits 40, 41 which drive a time difference circuit 16 as previously described. The output signal from the time difference circuit 16 is applied to a low pass filter 120 which is coupled to a servo amplifier 121 which drives the motor 116. The time difference circuit 16, as described above in conjunction with FIG. 2, contains a fixed delay in one of the channels to maintain the clock pulse error in a constant leading-lagging relationship, the fixed delay therefore introducing a DC component which may be counteracted by a balancing circuit 123 also coupled to the servo motor 116. Accordingly, when the output signals from the servo amplifier 121 and the balancing circuit 123 are equal, the output shaft of the motor 116 and the associated pinion 114 are maintained at a central position, holding the associated movable bearing 108 at the central position. Whenever the output signal from the low pass filter 120 varies in amplitude from the predetermined level, this system operates the servo motor 116 so as to introduce a compensating skew by movement of the roller 105. Conventional servo techniques, such as the use of lead-lag networks and alternative null balancing arrangements may also be employed.

Figure 9:
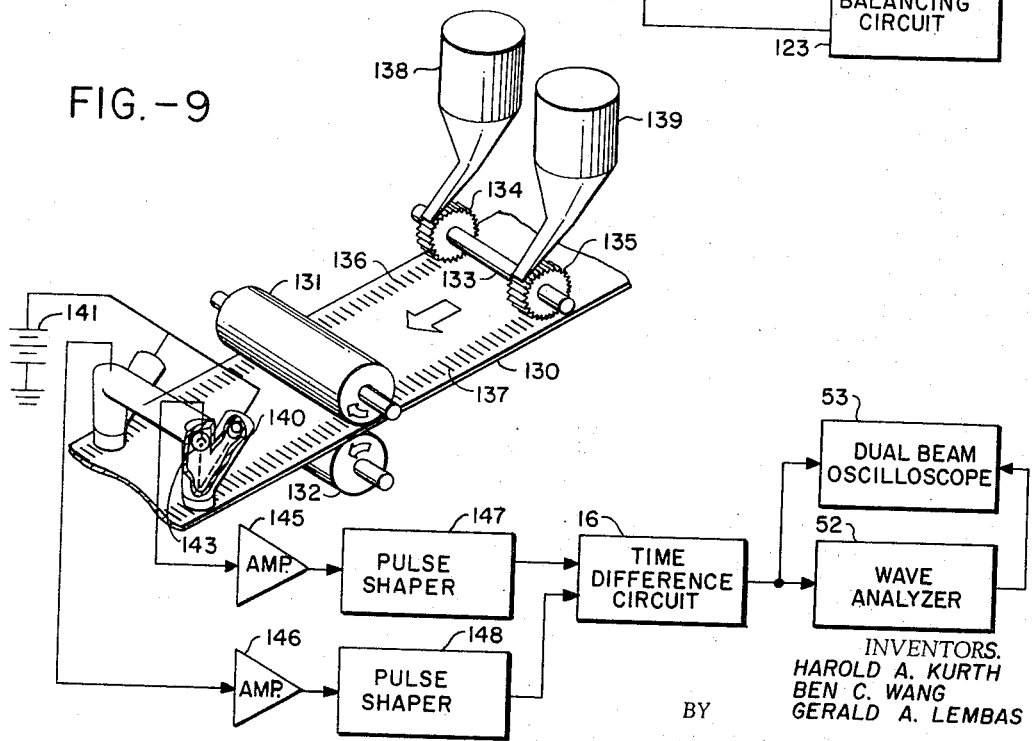

The arrangement of FIG. 9 illustrates an alternative application of systems in accordance with the invention, as applied to industrial systems having fixed installations in which magnetic or other incremental tracks may not be utilized. The specific example is the rolling of a thin sheet strip material 130 at high speed through a pair of finishing rollers 131, 132, or a finishing roller system. The finishing rollers 131, 132 and their associated driving and setting mechanisms, as well as the guide mechanisms for the strip material 130 usually generate a skew deviation in the longitudinally moving strip material. The amount of deviation may be minute, of the order of microinches, and therefore unapparent to the observer or undetectable by conventional measuring techniques. As is well known, the rolling process introduces a longitudinal extrusion effect on the rolled material, as well as a compression effect, so that if the reduction in size is not equal and substantially constant across the transverse dimension of the strip, an appropriate adjustment must be made to return the finished strip material 130 to the desired tolerances.

In this context, systems in accordance with the invention may utilize a visual incremental indicia pattern, detectable by photosensitive means. Like tracks of incremental indicia 136, 137 may be laid down by a pair of peripherally serrated marker rollers 134, 135 mounted on a common shaft 133, and each continually inked by associated ink supply and wetting mechanisms 138, 139 respectively. The subsequent size reduction and extrusion, as well as longitudinal advance, introduced by the illustrated finishing rolls 131, 132 and their associated drive mechanisms (not shown) cause longitudinal displacements of a time varying nature to exist between like paired individual indicia on the two tracks. The successive increments of the indicia 136, 137 are detected by photosensitive detection systems each including a light source 140 powered from a supply source 141 and a photodetector cell 143. Each detection system is disposed adjacent a different one of the tracks, and each includes a reflective light transmission path such that light from the source 140 is directed off the associated indicia toward the cell 143. Thus the signal generated by the cell 143 is modulated by the incremental indicia 136, 137 on the track.

The signals derived from the photosensitive cells 143 are then applied through separate amplifiers 145, 146 and pulse sharper circuits 147, 148 which generate brief time marker pulses having a fixed relation to a specific characteristic of the reproduced pulses in the fashion of the peak detector. Thereafter, both pulse trains are applied to a time difference circuit 16, the complex multifrequency output wave from which is applied to a wave analyzer 52 and to a dual beam oscilloscope 53 in the fashion of the system of FIG. 2.

It will be recognized that this system corresponds in operation and result to the essential details of the system of FIG. 2. Here again, measurements of dynamic characteristics and total dynamic variations are made while the system is in operation, and without affecting the normal operation of equipment. Furthermore, the measurements are extremely precise, and enable continual analysis of specific component characterisitcs.

It will also be appreciated that a number of other means for generating signals representative of time difference relationships, and the selected frequency components thereof, may also be employed. Signals recorded as sine waves or other periodic signals on the transversely spaced tracks may be used, instead of separate pulse patterns. If sine waves are used, the frequency should be selected such that a carrier is provided which is of a sufficiently high frequency for the modulation to be imposed thereon, but the carrier should not be so high that the deviation or dynamic skew of the mechanism introduces a relative shift of greater than one cycle. If these relationships are observed, a phase detector circuit may be employed to provide an analog signal representative of the instantaneous time displacement between the two reference tracks. However, with both sine waves and discrete pulses much larger dynamic skews can be tolerated by the use of periodic signals of a high frequency in conjunction with counter means. The relative incremental shifts between the two reference tracks may then be measured by counting the pulses.

It is clear, furthermore, that systems and devices provided in accordance with the present invention provide an entire new capability for dynamic systems analysis. Reference tracks having nominal parallelism and having like paterns disposed in nominal parallelism thereon, may be superimposed on or added directly to continuously moving sheet stock, bar stock or other linearly moving elements, or onto cyclically moving members. The reference tracks may be closely spaced or far apart, but even if relatively closely spaced (as on a magnetic tape) they provide a basis for analysis and a precision which have not heretofore been obtained. The examples given illustrate measurements which are representative of microinch devations, and these deviations can be identified as individual contributions from separate component parts of a dynamic mechanism.

While there have been described above and illustrated in the drawings various forms of dynamic analyzers in accordance with the invention, it will be appreciated that the invention may take a number of other forms. Accordingly, the invention should be considered to include all modifications, variations and alternatives falling within the scope of the appended claims.

What is claimed is:

1. A dynamic motion analyzer comprising means coupled to and moving with a mechanism to be analyzed for providing at least two sets of incremental indicia, the incremental indicia of the two sets being disposed to move along parallel paths during movement of the mechanism, the incremental indicia of each set being substantially alike and moving at like nominal velocities during movement of the mechanism, first and second sensing means, each disposed in fixed relation to the mechanism and adjacent to a different one of the incremental indicia sets, each of the sensing means being responsive to the passage of incremental indicia with respect thereto and providing signals representative thereof, means coupled to the first and second sensing means and responsive to the signals therefrom for providing a complex multifrequency wave representative of time differences between successive pairs of incremental indicia of the two sets, and means coupled to receive the complex multifrequency wave for filtering individual frequency components therefrom, whereby individual contributions to movement of the mechanism may be measured.

2. A system for analyzing the separate dynamic contributions of individual component parts to the operation of a complex dynamic mechanism comprising means coupled to the mechanism for generating separate successions of nominally like periodic signals representative of speed variations of two different portions of the mechanism having like nominal speeds, means responsive to the separate successions of periodic signals for providing a combined signal havng a characteristic which varies with the time difference between the generation of corresponding periodic signals of the separate successions, and filter means coupled to receive the combined signal and responsive to at least one selected frequency component of the combined signal, the selected frequency component being related to the characteristic frequency of an individual component part of the complex dynamic mechanism.

3. A method of analyzing individual contributions to irregular operation derived from individual component parts of a complex dynamic system which includes the steps of generating at least a pair of pulse trains having nominally like pulse repetition rates in response to the movement of at least two different portions of one of the component parts of the system, the two different portions having like nominal speeds, but being subject to minute variations therebetween, such that minute variations are introduced between the pairs of pulses from the two pulse trains, combining the two pulse trains to provide a time difference signal representative of the time differences between paired pulses from each of the two pulse trains, and measuring the amplitude of individual frequency components of the time difference signal, the individual frequency components corresponding to the characteristic frequencies of individual component parts of the complex dynamic system.

4. A system for analyzing the dynamics of a magnetic tape transport comprising: means including the magnetic tape for providing a pair of like clock tracks which are transversely displaced relative to the tape; means associated with the magnetic tape for separately reproducing pulses from the clock tracks during operation to provide a pair of nominally coincident clock pulses; delay means coupled to introduce a selected fixed delay into one of said clock pulses; resettable pulse generator means coupled to be set by the undelayed clock pulse and to be reset by the delayed clock pulse; ramp generator means coupled to the resettable pulse generator means, the ramp generator means providing a ramp waveform for the clock pulse pair which is initiated by setting and terminated by resetting of the pulse generator means; at least one bandpass filter means coupled to the ramp generator means, the bandpass filter means being set to pass a frequency corresponding to a selected characteristic frequency of the magnetic tape transport; and signal display means coupled to the bandpass filter means.

5. A system for analyzing the dynamics of a magnetic tape transport including a driven tape, the system comprising means including the magnetic tape for providing first and second clock tracks which are transversely displaced relative to the tape, the density of clock pulses along the clock tracks being sufficiently high relative to the speed of the tape to provide a repetition rate which is substantially in excess of the characteristic frequencies of the principal component parts of the magnetic tape transport; reproducing means associated with the separate first and second clock tracks on the magnetic tape to provide substantially like concurrent pulse pairs when the tape is moving longitudinally without dynamic skew; delay means coupled to one of the reproducing means to introduce a selected fixed delay into one of the reproduced clock pulses of each clock pulse pair; bistable multivibrator means having one input terminal coupled to the delay means and the other terminal coupled into the channel of the other reproducing means, such that the bistable multivibrator means is set by the undelayed pulse of each clock pulse pair and reset by the delayed pulse of each clock pulse pair; a ramp generator circuit coupled to the bistable multivibrator means, the ramp generator circuit providing a substantially linear triangular waveform during the set interval of the bistable multivibrator means, such that a train of pulses of sawtooth waveform having varying amplitudes dependent upon the time difference between the successive clock pulse pairs is provided; wave analyzer means coupled to the ramp generator circuit for filtering signals at at least one characteristic frequency of a component of the magnetic tape transport system, and oscilloscope means coupled to the wave analyzer means for displaying the amplitude of selected frequency components.

6. A system for analyzing the individual contributions of separate component parts of a magnetic tape transport system to dynamic skew of the magnetic tape comprising: means including the magnetic tape for providing a pair of substantially like clock tracks which are transversely spaced relative to each other along the tape; means associated with the magnetic tape for separately reproducing the clock tracks to provide clock signals in each of two signal channels; means coupled to the two signal channels for providing a time varying time difference signal representative of the time difference between clock pulse pairs derived successively from the two clock tracks; means coupled to the difference signal means for filtering individual frequency components from the time difference signal to provide monofrequency components at selected individual frequencies; and indicating means coupled to the filtering means for indicating the amplitudes of the monofrequency components.

7. A system for measuring and indicating incipient failure of a component part having a characteristic frequency in a complex mechanical system comprising means responsive to the movement of the complex mechanical system for generating a pair of substantially like signal trains each representative of the movement of different portions of the component part of the system and thereby having independent variations, means coupled to the signal train means for generating a complex multifrequency wave representing the variations in time difference between the occurrence of corresponding pulses in the signal trains, and means coupled to the multifrequency wave means and selected in accordance with the characteristic frequency of the component part for indicating the presence of a monofrequency component in the multifrequency wave in excess of a selected level at the desired characteristic frequency.

8. A system for monitoring the operation of the component parts of a complex mechanical system comprising means coupled to the mechanical system for providing a pair of signal pulse trains representative of the movement of different spaced apart portions thereof, means coupled to the signal pulse train means for providing a combined signal representative of variations in the time between the occurrence of corresponding pulses of the pulse trains, and separate frequency selective means coupled to the combined signal means for detecting the separate individual characteristic frequencies of each of the component parts of the system and producing a warning signal when one of said components of the combined signal is in excess of a selected level.

9. A system for monitoring the operation of selected control components in a complex dynamic mechanism having a number of components contributing to a positional variation of a selected part comprising a pair of indicia means disposed along the direction of movement of the selected part, means disposed in fixed relation to and adjacent the indicia means for generating a pair of nominally like wave trains representative thereof, time differences between the occurrence of comparable segments of the wave trains representing instantaneous positional variations of the selected part due to the operation of any of the number of components, means coupled to the generator means for deriving a time-varying signal representative of differences in time between the occurrence of comparable segments of the wave trains, a plurality of frequency selective means coupled to the time-varying signal means, each being tuned to select the characteristic frequency of one of the selected control components, and indicator means connected to the frequency selector means for indicating the time differences caused when one of the selected control components exceeds a selected level.

10. A system for minimizing contributions of individual component parts to imbalance of a complex dynamic mechanism comprising means including an incremental indicia set for attachment to and movement with one of the individual component parts along a track, said indicia set comprising a plurality of discrete indicia substantially equally spaced along the track, indicia sensing means for providing periodic signals representative of the time of passage of each of the indicia, means for disposing the sensing means adjacent the indicia track and in fixed relationship thereto, means coupled to receive the periodic signals for generating a complex multifrequency wave representing the time variation between the sensing of successive incremental indicia, means coupled to receive the complex multifrequency wave for extracting individual component frequencies corresponding to characteristic frequencies of component parts of the system, and means responsive to at least one of the extracted component frequencies for minimizing the imbalance contributed by the corresponding component part of the system.

11. A system for measuring contributions of individual component parts to imbalance of a complex dynamic mechanism comprising: first means mounted on a first part of the complex dynamic mechanism and movable therewith along a selected first track, second means mounted on a second part of the complex dynamic mechanism and movable therewith along a selected second track, the second track being spaced apart from the first but having a like nominal velocity although subject to minute rate changes, first and second indicia means attached to each of the first and second means and each providing incremental indicia sets extending along the first and second tracks respectively, the incremental indicia sets being substantially identical, means disposed adjacent the first and second indicia means for sensing the indicia to provide periodic signals representative thereof, means coupled to receive the periodic signals for generating a complex multifrequency wave representing the successive time differences between individual cyclic parts of the periodic signals, and means coupled to receive the complex multifrequency wave for extracting individual component frequencies corresponding to characteristic frequencies of component parts of the system.

12. A system for controlling the operation of a selected control component in a complex dynamic mechanism having a number of components contributing to a positional variation of a selected part comprising: a pair of indicia means disposed along the direction of movement of the selected part, sensing means positioned adjacent the indicia means for generating a pair of nominally like wave trains representative of movement of the indicia means thereby, time differences between the passage of comparable segments of the wave trains past the sensing means representing instantaneous positional variations of the selected part, means coupled to receive the generated wave trains for deriving a time-varying signal representative of the total positional variation of the selected part, filter means coupled to receive the time-varying signal for selecting at least one frequency range from the time varying signal, said selected frequency range including the characteristic frequency of one of said components, and means coupled to receive the selected frequency range of the time-varying signal for operating the control component to minimize the time-varying signal.

13. A system for controlling the operation of a selected one of a number of control components contributing to a positional variation of a selected part of a complex dynamic mechanism comprising a pair of separated indicia tracks disposed for movement with the selected part, sensing means for generating a pair of nominally like wave trains representative of the instantaneous positions of the indicia tracks on the selected part, means for receiving the wave trains and generating a complex multifrequency wave representing variations in the time of generation of corresponding parts of the wave trains, means coupled to the multifrequency wave means for filtering a portion of the multiferquency wave which lies within a selected frequency range and which includes the characteristic frequency of the selected one of the control components, and means responsive to the filtered portion of the multifrequency wave for changing the operation of the selected control component to minimize the positional variations of the selected part caused by the selected control component.

14. A control system for reducing the skew in a moving magnetic tape due to operation of components having certain characteristic frequencies comprising a pair of like indicia tracks including a series of like incremental elements disposed longitudinally along the direction of movement of the tape and transversely spaced from one another at the edges of the tape, sensing means mounted in fixed relation to the moving tape for sensing the successive increments in each of the indicia tracks and providing a pair of signal trains representative thereof, means coupled to the sensing means and responsive to the wave trains for providing a complex multifrequency wave representative of time differences between like increments due to skewing of the tape, frequency selective means coupled to receive the complex mutlifrequency wave for extracting the frequency component equal to the characteristic frequencies of the components, and means coupled to receive a selected one of the extracted frequency components and responsive to the signal level thereof for varying the position with relation to the tape of the component corresponding to the extracted frequency components to balance the skew.

15. A system for monitoring the operation of a high speed sheet material advancing system comprising means positioned adjacent the sheet material for providing markings at preselected increments along the material in transversely spaced parallel tracks to provide contrasting optical indicia, a pair of photosensitive sesning means in a fixed relation to the moving sheet material for sensing separate ones of the tracks, means coupled to the sensing means for generating varying amplitude pulses representative of the time difference of sensing of corresponding ones of the optical indicia, and means coupled to receive the amplitude variations of the pulses for identifying, for at least one selected frequency band, amplitude varitions of frequency components characteristic of one element of the system.

16. A system for analyzing the operation of a complex strip driving apparatus in which the driving member contacts a strip comprising means disposed adjacent the moving strip for disposing upon the strip two transversely spaced parallel tracks of individual indicia having like increments therebetween, a pair of indicia sensing means in fixed relation to the moving strip for sensing the individual indicia in separate ones of the tracks, means coupled to the sensing means for generating a complex multifrequency wave representing time differences between the sensing of successive like indicia on the two parallel tracks, and wave analyzer means coupled to receive the complex multifrequency wave and provide an output signal indicative of at least one selected frequency band characteristic of the natural mechanical frequency of one of the components of the driving apparatus.

References Cited

UNITED STATES PATENTS

| | | | |
|---|---|---|---|
| 1,972,075 | 9/1934 | Clark | 242—57.1 |
| 2,151,570 | 3/1939 | Shoults | 83—74 |
| 2,191,673 | 2/1940 | Moore | 346—140 |
| 2,751,439 | 6/1956 | Burton | 179—100.28 |
| 2,870,430 | 1/1959 | Hancock | 179—100.2 |
| 2,937,239 | 5/1960 | Garber | 340—174.1 |
| 2,977,924 | 4/1961 | Bender | 226—15 |
| 3,029,385 | 4/1962 | Steinbrenner | 324—77 |
| 3,254,300 | 5/1966 | Prell | 324—68 |

OTHER REFERENCES

Instruments and Control System, March, 1960, pp. 430, 431.

Magnetic Recording Handbook, R. E. B. Hickman, Newnes, London, 1956, pp. 135, 136.

RUDOLPH V. ROLINEC, *Primary Examiner.*

WALTER L. CARLSON, *Examiner.*

M. J. LYNCH, *Assistant Examiner.*